INVENTOR
PETER BAUER

United States Patent Office 3,340,885
Patented Sept. 12, 1967

---

3,340,885
PRESSURE BAND DETECTOR
Peter Bauer, Bethesda, Md., assignor to Bowles Engineering Corporation, Silver Spring, Md., a corporation of Maryland
Filed May 26, 1964, Ser. No. 370,160
11 Claims. (Cl. 137—81.5)

The present invention relates to pure fluid systems and, more particularly, to a combination of pure fluid elements for detecting and amplifying a fluid pressure signal.

It is desirable in many cases to detect and thus measure a fluid pressure within a very specific limit and produce an amplified pressure signal in response thereto. More particularly, it may be desirable to detect a variation from a range or norm of fluid pressures and produce an amplified pressure signal in response thereto. Regarding the latter, by providing a system whereby a variation in fluid pressure from a norm can be detected and amplified, a control over that pressure can be established in a convenient manner.

In the past, pressure measuring and detecting systems have employed moving parts, and thus are obviously not desirable in terms of speed, reliability and maintenance. More particularly, prior art devices have employed delicate gauges, which are subject to inaccuracies and repeated failures, and various combinations of delicate electrical switches, which tend to become fouled and inoperative. Upon failure of any one of the various parts of these prior art devices, the entire system may become inoperative and the pressure detection function lost. Also, as these systems are subjected to repeated use, the accuracy and sensitivity of the delicate parts are adversely affected by wear, fatigue, foreign matter and service conditions, such as jolts and bumps.

According to the present invention, a device for detecting and amplifying a pressure signal that is simple, has no moving parts, and is maintenance free is provided. The device is simple in that it requires only two different types of pure fluid elements and has no maintenance requirements since there are no moving parts. In addition, the present device requires very little space and is not affected by service conditions.

Prior to the present invention, there has not been a highly sensitive pressure detector available that has the reliability of a pure fluid system. The device of the present invention has been tested and found to be capable of making accurate pressure detections within one hundredth of a pound per square inch with ease, as well as being capable of having the indetermine service life usually attributed to a pure fluid system.

According to my invention, a fluid system comprising a pair of fluid pressure detectors is provided wherein each of said detectors comprises an exclusive "or" fluid element or comparator, as it is sometimes called, staged in series with a digital fluid amplifier which in the embodiment illustrated comprises a nor-gate i.e. the output channel of each comparator provides the control fluid signal flow of a digital amplifier. In the system, a maximum pressure detector is provided wherein one comparator receives an input pressure signal and a maximum bias pressure signal in such a manner that when the signals are equal there is no fluid flow in the output channel of the comparator. When there is no output flow from the comparator, it follows that there is no control signal for the nor-gate since the output flow of the comparator is the control signal of the amplifier. When there is no control signal, the nor-gate produces an amplified output signal, which indicates that the input pressure equals the maximum bias pressure. Similarly, a minimum pressure detector is provided wherein the other comparator of the system receives the same input pressure and a minimum bias pressure so that when the input pressure equals the minimum bias pressure, there is produced an amplified output signal in the same manner as described with respect to the maximum pressure detector. Thus, with a pair of detectors, the input pressure may be compared to both maximum and minimum bias pressures so that detection of a variation in pressure from a normal range can be effected. The output signals from the corresponding amplifiers of the detectors actuate a final output device, which may be a counter or computer that records the occurrence of both the maximum and minimum pressures or a fluid pressure compensator which raises or lowers the input pressure automatically in response to said output signals.

It is noted that a single pressure detector could be employed to detect pressure in a system, if desired. Such a device could be used, for example, as a warning device for a pressure system where it is desired to detect only one condition, such as excessively high or low pressure.

It is an object of the present invention to provide a pure fluid detector system for a fluid pressure.

It is also an object of this invention to provide a device to detect maximum and/or minimum pressure in a fluid system.

It is a further object of this invention to provide a fluid comparator means that controls a digital fluid amplifier in such a manner that a fluid output signal is provided in response to a maximum and minimum pressure fed to the comparator.

Still another object of this invention is to provide plural fluid comparator means to produce plural fluid control signals in response to variation in fluid pressure in an input means and corresponding plural amplifier means to produce a fluid output signal or plural fluid output signals in response to said control signals.

The above and still further objects, features and advantages of the present invention will become apparent upon consideration of the following detailed description of one specific embodiment thereof, especially when taken in conjunction with the accompanying drawings, wherein.

Figure 1:
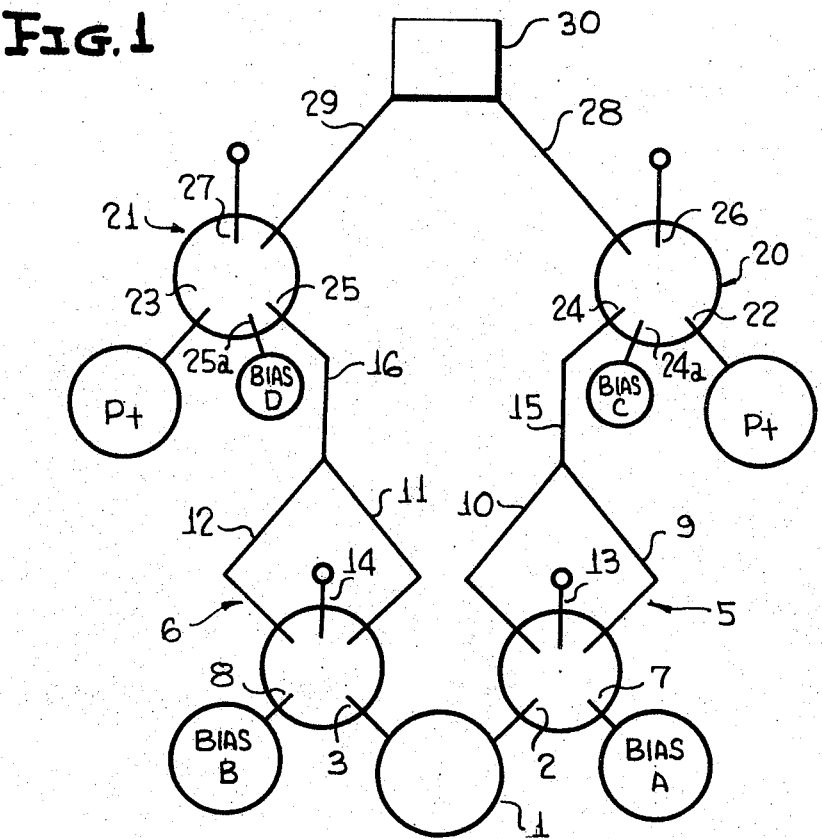
FIGURE 1 is a schematic diagram of the entire system of the present invention.

Referring now specifically to FIGURE 1 of the accompanying drawings, there is illustrated a schematic flow diagram of the entire system of the present invention. As previously indicated, an object of the present invention is to indicate when a maximum and minimum pressure is present in a fluid system. In other words, an output signal is produced by this system when the pressure in the input signal exceeds the limits of a dead band range of pressure, which has previously been selected.

A fluid input signal, wherein the pressures are to be determined is generated in an element designated by the reference numeral 1 this element not being discussed further since it forms no part of the present invention. The input signal is fed via two nozzles designated 2 and 3, to two passive exclusive "or" fluid elements 5, 6, respectively. The exclusive "or" elements are used as comparators and each is thus provided with a different constant bias signal A or B from nozzles 7 or 8, respectively.

Each comparator or exclusive "or" element 5, 6 is provided with two output channels designated 9, 10 and 11, 12, respectively, as illustrated in FIGURE 1. In addition, each comparator element 5, 6 is provided with a center passage or dump 13, 14, respectively, which merely releases the unwanted fluid to atmosphere or to a sump, as desired. Output channels 9 and 10 are combined into control passage 15 for supplying a nor-gate 20 with a single control signal. Similarly, output channels 11 and 12 are combined into control passage 16 for another nor-gate 21.

The nor-gates 20 and 21 receive control signals from the control passages 15, 16 via control nozzles 24, 25, respectively. Each nor-gate 20 or 21 may, if desired for greater precision of control, be provided with adjustable bias signal C or D from nozzles 24a or 25b, respectively, for adjustment of their sensitivity, as will be explained more in detail later.

The nor-gates 20, 21 have power nozzles 22, 23, respectively, which are adapted to issue power streams from power source P+ in the conventional manner. At all times when a control signal is being received at both of the control nozzles 24, 25, the nor-gate power streams are directed to dumps 26, 27 and there is no output signal from either gate. However, when a control signal is not being received at either one of the nozzles 24, 25, the corresponding power stream is directed through the corresponding output passage 28, 29 to output passage 30, which is common to both nor-gates. Thus, each combination of a comparator and a nor-gate is a fluid pressure detector adapted to detect either a maximum or minimum pressure.

The operation of the detector system will become clearer upon the consideration of the characteristics and the operation of the individual elements making up the system that follows.

Figure 2:
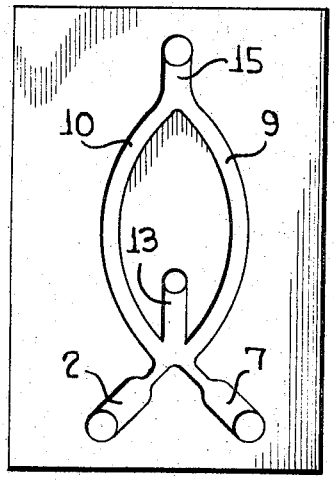
FIGURE 2 is a diagram illustrating an exclusive "or" fluid element which is used as a comparator in the system of the present invention.

In FIGURE 2 of the drawings, a comparator element is illustrated and, although two of these elements are shown in FIGURE 1, only element 5 need be separately discussed herein since they are identical. Elements common to both figures bear the same reference numerals. The comparator element 5 is supplied with a constant bias signal as at 7 and a variable input signal as at 2. As will be seen later, the bias signal and the input signal are maintained within a narrow range of pressures, i.e. the pressure of the bias signal is at all times during normal operation almost equal to the pressure in the input signal. Within this narrow range, a pressure gain over the input signal of approximately 1.5 has been measured after interaction with the bias signal. This quality is largely due to the shortness of the interaction region or divider distance which prevents excessive pressure loss.

As shown in the illustration, the fluid signals from nozzles 2 and 7 intersect each other at an angle in the interaction region of the comparator element 5. When the input signal at 2 is equal to the bias signal A at 7, the two streams issuing from the nozzles effectively cancel each other, whereby they flow to the center passage 13. At all other times, i.e. when the input signal at 2 is either greater or less than the bias signal A at 7, an output signal is produced in one of the output channels 9, 10. When an output signal is produced in either of the output channels 9, 10, a control signal is produced in the control passage 15, since said control passage 15 receives signals from both output channels 9, 10, as illustrated.

As a further explanation, the comparator element 5 is considered to be a differential device. In other words, this comparator element compares two signals and provides an output which is a function of the input signal difference. For example, when an input signal at the nozzle 2 is compared to and found to be greater than the signal at the nozzle 7, an output signal is produced in the output channel 9. Likewise, when the signal in the nozzle 7 is greater than the signal in the nozzle 2, an output signal is produced in the output channel 10. As can be seen, these output signals are proportional to the differences in magnitude of the two signals at the nozles 2 and 7, since as one signal gets progressively larger than the other, a larger proportion of the interacting streams is directed to one of the output channels 9, 10 and away from dump 13, thereby increasing the magnitude of the output signal.

Figure 3:
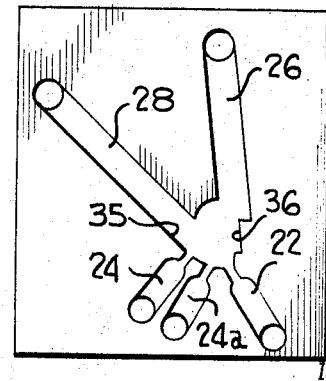
FIGURE 3 is a diagram illustrating a digital fluid amplifier, which is used in combination with the comparator of FIGURE 2 to provide an output signal.

Referring to FIGURE 3, the nor-gate 20 is illustrated and is now described, it being understood that nor-gate 21 is identical. The gate 20 is supplied with fluid from the power source P+ and the fluid issues in a power stream from the nozzle 22 to either the output passage 28 or to the dump passage 26. The stream is biased to the output passage 28 by what is known as the "boundary layer effect." This phenomenon is explained in detail in the Horton Patent No. 3,111,291.

The control nozzle 24 is provided to issue fluid into the associated boundary layer region adjacent left sidewall 35 in such a manner that when there is a substantial control signal present, the pressure in the low pressure "bubble" becomes greater than the pressure in the opposing boundary layer region located on the opposite or right side 36 of the power stream, thereby effecting switching towards the opposite side of the amplifier. Thus, it can be seen that, at any time a substantial amount of fluid is flowing from nozzle 24, the boundary layer attachment effect is interrupted and the main stream is directed to the dump passage 26. In short, the main stream is directed to output channel 28 when there is a substantial absence of fluid flow at the control nozzle 24 and is directed to dump passage 26 when a substantial fluid flow is present.

For adjustment of the sensitivity of the amplifier 20, an adjustment nozzle 24a may be provided adjacent the control nozzle 24 and is adapted to provide either a positive fluid flow to raise the pressure or a negative fluid flow to lower the pressure in the low pressure "bubble" of the left boundary layer region. In other words, either by inserting fluid into the "bubble" by pressure or removing fluid from the "bubble" by vacuum, a very fine adjustment of the switching action of the power stream of the amplifier can be realized. The adjustment required is usually very small since the amplifiers are designed with a particular pressure range in mind.

By using the adjustment just described, the operator can adjust the detector system at start-up with a very simple procedure. Referring again to FIGURE 1, the bias signal A is first set at the desired minimum level to be detected. Next, the input signal at 1 is set at a level higher than the bias signal A and slowly lowered until it just equals said bias signal A. If the minimum detector system is properly adjusted, the power stream of the nor-gate 20 should at this point flip and produce an output signal via output passage 28. If the flip of said power stream is found to occur before the desired minimum pressure of the input signal at 1 is reached, the bias signal C is set for positive fluid flow to raise the pressure in the left boundary layer region to compensate for the discrepancy. On the other hand, if the flip has not occurred by the time the desired pressure in input signal 1 has been reached, it follows that a negative fluid flow at nozzle 24a is required to reduce the pressure in the left boundary layer region so that the flip will occur properly. After adjustment of bias signal C has been attained, the same procedure is followed to adjust the sensitivity of the amplifier 21 by adjusting the bias signal D.

After the system has been found to be adjusted properly with the various bias levels set and the pressure in the input signal returned to the middle of the desired range, the system is ready for operation. The actual operation of the system will become clearer upon consideration of a specific pressure detection problem.

Assume that it is desired to select a pressure of 6 p.s.i.g. with normal permitted output variation of ±0.12 p.s.i.g. Thus, any signal pressure beyond a dead band range of 5.88 p.s.i.g. to 6.12 p.s.i.g. is to be detected and counted, whether above or below this range of pressures set. Accordingly, bias A of comparator element 5 is set at 5.88 p.s.i.g. and bias B of comparator element 6 is set at 6.12 p.s.i.g. The bias pressures are maintained at these constant values and are used to compare the input 1.

In comparator element 5, assuming the input 1 pressure to be 6.00 p.s.i.g., it can be seen that an output signal is produced in the output channel 9, through the control passage 15 and to the nozzle 24. This signal at 24 prevents the power stream issuing from nozzle 22 from attaching to the left sidewall 35 and from thereby producing an output signal through the amplifier output passage 28. Similarly, in comparator element 6, an output signal is produced in the output channel 11 through the control passage 16 and to the control nozzle 25. Thus, the main stream issuing from nozzle 23 is prevented from locking on the sidewall of output passage 29 and is dumped at the passage 27 in the same manner as above. Accordingly, there is no output signal received at 30 since the control streams issuing from both nozzles 24 and 25 cause the main streams of amplifiers 20 and 21, respectively, to divert to the passages 26, 27, respectively. However, it is seen that, if the input pressure at 1 is exactly 5.88 p.s.i.g., the fluid streams from nozzles 2 and 7 in comparator element 5 cancel each other out and substantially all the fluid is dumped at center passage 13. When this is true, there is no signal produced at 24 strong enough to divert the power stream issuing from nozzle 22, and said stream is allowed to enter output passage 28 to cause a signal at 30. Similarly, if the input pressure at 1 is exactly 6.12 p.s.i.g., no control signal is produced at nozzle 35 and, therefore, the main stream issuing from the nozzle 23 is allowed to attach to the sidewall and to proceed through output passage 29 to produce the output signal at 30.

The present invention has been tested and the switching hysteresis has been found to be well less than 0.08 p.s.i.g., and therefore at an acceptable level in this system.

The nor-gate of FIGURE 3 may be operated as an or-gate simply by taking the output signal from passage 26 instead of passage 28. The circuit of FIGURE 1 may be operated with or-logic by placing an inverter in the fluid logic circuit between each of output passages 26 and 27 and the input channels to the element 30.

It is to be understood that output device 30 may be a suitable counter or computer, which records each time that the signal 1 is either at the maximum or minimum value. In this case, the output device 30 would combine the output signals from amplifiers 20 and 21 into a single passage and perform a counting operation at each signal denoting either a maximum or minimum pressure condition.

However, by retaining the ouput signals in separate passages, the output device 30 may be utilized through suitable apparatus to raise or lower the pressure in input 1. For example, if a signal is received at the output passage 28, a valve could be actuated to increase the pressure in input 1 since comparator 5 has detected the minimum pressure present. On the other hand, if a signal is received at the output passage 29, this is indicative of the maximum pressure being present in input 1 and therefore, input 1 is vented to atmosphere if the system is pneumatic, or drained, if the system is hydraulic, to lower the pressure therein.

Where operations other than simple counting are being performed by the present invention, the output device 30 must remain shut down once a maximum or minimum pressure has been detected until being reset by the operator. This is true since a range of pressures of the input signal other than the preselected maximum or minimum pressure removes the output signal whether inside or outside the dead band range of pressures. By requiring a resetting of the system each time, the pressure in the input signal is always assured of being within the dead band range during operation.

An obvious alternative to manual resetting would be to utilize the signals produced in output channels 10 and 12 separately from the signals produced in the output channels 9 and 11. In other words, since channels 10 and 12 receive signals only when the pressure in the input signal at 1 is outside the dead band range, said signals could be utilized to reset the output device 30 for operation upon detection of a resumption of normal pressure within the dead band range of the input signal at 1.

A second alternative is to count two full pressure signals in the center dump passages 13, 14, which denotes the presence of the critical pressure, before resetting of output device 30. By counting two full pressure signals at said dumps, the pressure in the input signal at 1 is certain to be within the dead band range desired since one signal occurs on the way out of said range and the second signal occurs on the way back into said range.

It should be noted that while the present invention has been related to and described with respect to the measurement of maximum and minimum pressure in a fluid input 1, it is clear that any other normal fluid parameter may be measured by this invention. For example, temperature, specific volume, mass flow, momentum and others which affect the pressure could be measured by the present invention.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A fluid system for detecting the fluid pressure of an input signal comprising fluid bias means for producing a reference pressure signal, fluid comparator means for producing a fluid pressure control signal which varies in direct proportion to the absolute magnitude of the difference between said input signal and said reference signal, digital amplifier means for producing an output signal only when said control signal has a pressure less than a predetermined pressure, and threshold adjustment means included in said digital amplifier means for establishing said predetermined pressure at a specified level within a range of said levels.

2. The fluid system as claimed in claim 1, wherein said reference pressure signal is a constant.

3. The fluid system as claimed in claim 1, wherein said digital amplifier means is of the nor-gate type.

4. A fluid system for detecting pressure variations of a fluid pressure input signal, comprising:
    a fluid pressure reference signal;
    fluid comparator means responsive to said input and reference signals for producing only one fluid control signal having a pressure proportional to the absolute value of the pressure differential between said input and reference signals;
    means responsive to said control signal for producing a fluid output signal only when the pressure of said control signal is less than a predetermined value;
    threshold adjustment means for establishing said predetermined value at some value within a specified range of values.

5. The system of claim 4 wherein said means responsive to said control signal is a pure fluid amplifier of the monostable type.

6. The system of claim 5 wherein said pure fluid amplifier is a NOR element.

7. The system of claim 6 wherein said comparator means is a pure fluid element of the stream deflection type.

8. A fluid system for detecting fluid pressure variations of an input signal comprising fluid bias means for producing a first reference pressure signal, fluid comparator means for producing a first control signal which varies in proportion to the absolute magnitude of the pressure difference between said input and first reference signals, and output means for producing a first output signal only and whenever said first control signal is of substantially zero pressure.

9. The system of claim 8 wherein said output means includes threshold means for adjusting the sensitivity of the output means in response to said control signal.

10. The system of claim 8 further comprising an additional fluid bias means for producing a second reference pressure signal, a second fluid comparator means for producing a second control signal which varies in proportion to the absolute magnitude of the pressure difference between said input signal and said second reference signals, and second output means for producing a second output signal only and whenever said second control signal is of substantially zero pressure.

11. The system of claim 10 wherein said first reference signal represents a minimum desired input signal pressure and said second reference signal represents a maximum desired input signal pressure, and further comprising means for combining said first and second output signals to produce a common output signal only when said input signal pressure is substantially equal to that of either said first or second reference signals.

References Cited

UNITED STATES PATENTS

| | | | |
|---|---|---|---|
| 3,107,850 | 10/1963 | Warren et al. | 137—81.5 X |
| 3,111,291 | 11/1963 | Horton | 137—81.5 |
| 3,159,168 | 12/1964 | Reader | 137—81.5 |
| 3,216,439 | 11/1965 | Manion | 137—81.5 |
| 3,233,621 | 2/1966 | Manion | 137—81.5 |
| 3,238,959 | 3/1966 | Bowles | 137—81.5 |
| 3,240,219 | 3/1966 | Dexter et al. | 137—81.5 |

OTHER REFERENCES

Fluid Logic Devices and Circuits, A. E. Mitchell et al., Fluid Power International, July 1963, pp. 245, 246.

Binary Full Adder, A. E. Mitchell, I.B.M. Technical Disclosure Bulletin, vol. 6, No. 4, September 1963, pp. 93, 94.

M. CARY NELSON, *Primary Examiner.*

S. SCOTT, *Assistant Examiner.*